(12) United States Patent
Sharpe et al.

(10) Patent No.: US 9,907,727 B2
(45) Date of Patent: *Mar. 6, 2018

(54) VIAL GRIPPER

(71) Applicants: Gary L. Sharpe, Naples, FL (US);
Brian Dutro, Columbus, OH (US)

(72) Inventors: Gary L. Sharpe, Naples, FL (US);
Brian Dutro, Columbus, OH (US)

(73) Assignee: Gary L. Sharpe, Naples, FL (US)

( * ) Notice: Subject to any disclaimer, the term of this patent is extended or adjusted under 35 U.S.C. 154(b) by 359 days.

This patent is subject to a terminal disclaimer.

(21) Appl. No.: 14/120,360

(22) Filed: May 14, 2014

(65) Prior Publication Data

US 2015/0014492 A1 Jan. 15, 2015

Related U.S. Application Data

(63) Continuation-in-part of application No. 14/067,251, filed on Oct. 30, 2013, now Pat. No. 9,622,941.

(60) Provisional application No. 61/823,245, filed on May 14, 2013, provisional application No. 61/720,200, filed on Oct. 30, 2012.

(51) Int. Cl.
| | |
|---|---|
| *F16M 11/00* | (2006.01) |
| *A61J 1/16* | (2006.01) |
| *F16M 13/02* | (2006.01) |
| *B01L 9/06* | (2006.01) |
| *B01L 9/00* | (2006.01) |

(52) U.S. Cl.
CPC . *A61J 1/16* (2013.01); *B01L 9/06* (2013.01); *F16M 13/02* (2013.01); *B01L 9/50* (2013.01); *B01L 2200/023* (2013.01)

(58) Field of Classification Search
CPC ... A61J 1/16; F16M 13/02; B01L 9/06; B01L 9/50
USPC ......... 248/68.1, 110, 111, 113, 176.1, 316.8; 211/62, 70.6, 94.01; D7/641; D24/224; 234/89, 131; 604/192, 263
See application file for complete search history.

(56) References Cited

U.S. PATENT DOCUMENTS

| | | | |
|---|---|---|---|
| 2,206,728 A | 7/1940 | Nevins | |
| 2,371,433 A * | 3/1945 | Davis | B25H 3/04 211/162 |
| 2,542,442 A * | 2/1951 | Weber | F16L 3/223 248/68.1 |
| 2,913,740 A * | 11/1959 | Eldridge | A61G 7/0503 174/135 |
| 3,210,816 A * | 10/1965 | Clemons | A61C 19/00 128/852 |
| 3,288,137 A * | 11/1966 | Lund | A61M 25/02 128/DIG. 26 |
| D220,606 S * | 4/1971 | Larson | 234/131 |

(Continued)

FOREIGN PATENT DOCUMENTS

EP 254487 1/1988

*Primary Examiner* — Gwendolyn W Baxter
(74) *Attorney, Agent, or Firm* — Standley Law Group LLP; Jeffrey Standley; Beverly Marsh

(57) ABSTRACT

A vial gripper and gripper assembly having a base and a clamp extending therefrom made from an elastomeric material. The clamp adapted to retain a vial, ampoule, or other containers therein typically used in the hospital or clinical setting. The gripper assembly includes an elevated body having a guide wherein a gripper is insertable, and wherein the assembly may be further securely stored within a unit tray.

7 Claims, 8 Drawing Sheets

(56) References Cited

U.S. PATENT DOCUMENTS

| | | | |
|---|---|---|---|
| 3,751,172 A | | 8/1973 | Seitz |
| 3,812,976 A | | 5/1974 | Rempel |
| 3,837,633 A | * | 9/1974 | Paulsen .................... B01L 9/06 |
| | | | 24/517 |
| 4,453,639 A | | 6/1984 | Sharma |
| 4,474,056 A | | 10/1984 | O'Brien |
| 4,606,735 A | * | 8/1986 | Wilder .................. A61M 25/02 |
| | | | 128/DIG. 26 |
| 4,947,996 A | | 8/1990 | Harris |
| 5,133,454 A | * | 7/1992 | Hammer .............. B65D 25/105 |
| | | | 206/364 |
| 5,224,674 A | * | 7/1993 | Simons ................. F16L 3/2235 |
| | | | 248/68.1 |
| 5,279,578 A | * | 1/1994 | Cooke .................. A61M 5/3213 |
| | | | 206/365 |
| 5,927,660 A | | 7/1999 | McNerney |
| 6,082,544 A | | 7/2000 | Romick |
| 6,257,408 B1 | * | 7/2001 | Odierno ................ A61M 5/008 |
| | | | 206/365 |
| 6,474,482 B2 | * | 11/2002 | Manix .................... A47B 81/00 |
| | | | 211/70.6 |
| 6,561,464 B2 | | 5/2003 | Cumby |
| 7,540,456 B2 | * | 6/2009 | Thompson ............. A47G 1/175 |
| | | | 211/105.1 |
| 7,744,572 B2 | * | 6/2010 | Bierman ............... A61M 25/02 |
| | | | 206/366 |
| 8,523,824 B2 | | 9/2013 | Teirstein et al. |
| D702,832 S | * | 4/2014 | Hadley ....................... D24/128 |
| 9,622,941 B2 | * | 4/2017 | Sharpe ..................... B01L 9/06 |
| 2010/0133397 A1 | | 6/2010 | Hu |

\* cited by examiner

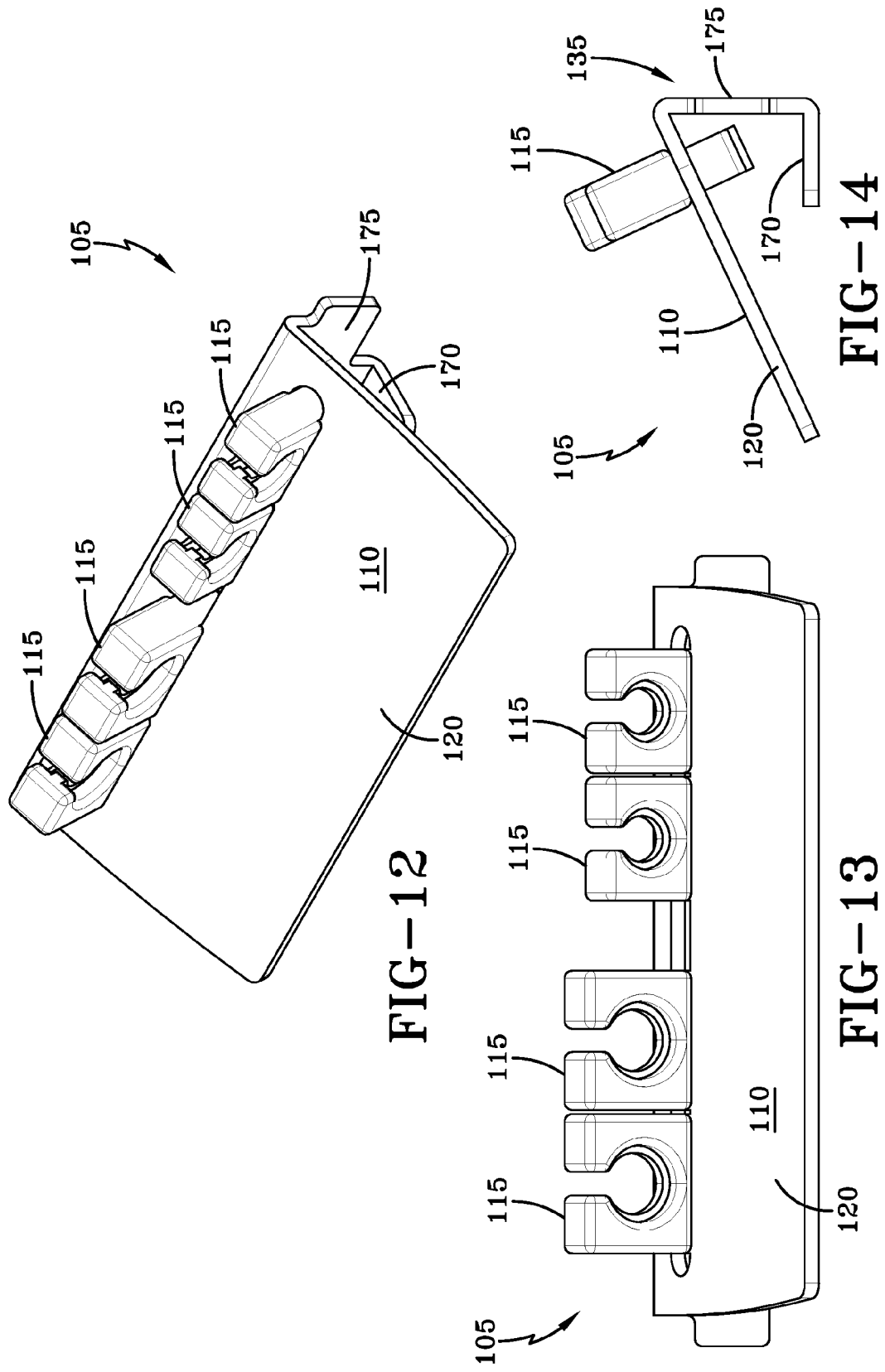

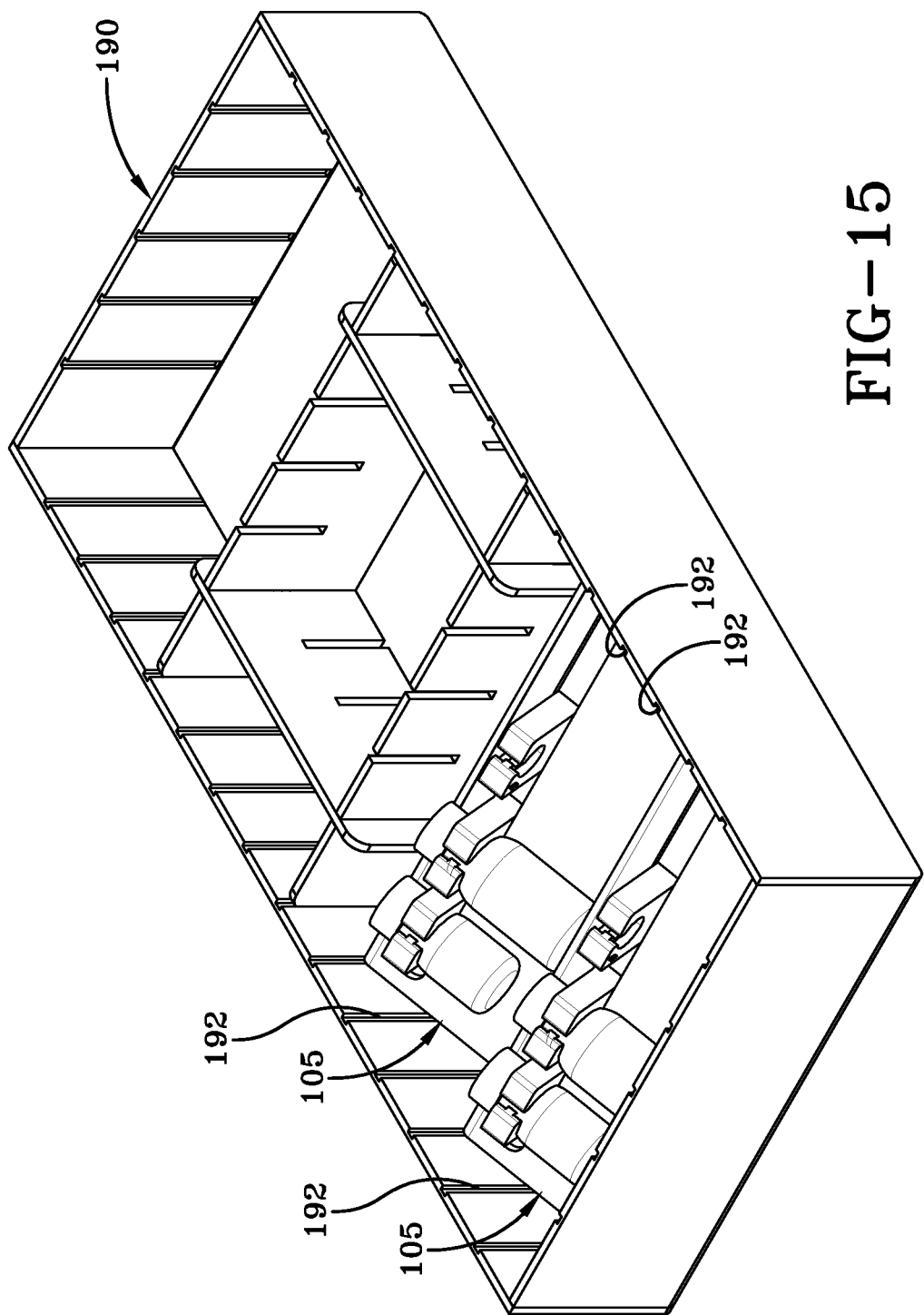

US 9,907,727 B2

VIAL GRIPPER

CROSS-REFERENCE TO RELATED APPLICATIONS

This application claims priority to U.S. patent application Ser. No. 61/823,245 filed 14 May 2013, and is a continuation in part of and claims priority to U.S. patent application Ser. No. 14/067,251 filed 30 Oct. 2013 which in turn claims priority to U.S. Provisional Application No. 61/720,200 filed 30 Oct. 2012. The content of each aforementioned application is hereby incorporated by reference as if fully recited herein.

TECHNICAL FIELD

The present invention relates to an apparatus for holding and supporting a vial, test tube, ampoule, syringe or other containers.

BACKGROUND OF THE ART

A side effect of the ever increasing number of medications in the hospital and clinical settings is the increased need for additional storage space. More concerning however, is that the increase in the number of medications also increases the likelihood of medication errors occurring. Hospitals are becoming increasingly aware that errors in medication are occurring as a result of poor storage solutions.

It is estimated that between about 40,000 and 100,000 individuals die in hospitals each year as a result of preventable errors. The number-one case of adverse and preventable patient events is medication error which leads to an estimated 7,000 deaths annually. According to insurers, medication error is the most frequent cause of procedural related malpractice claims. Commonly these mistakes are made when two products have similar packaging and one drug is mistaken for the other. Medication errors may also occur when similarly packaged vials contain the same medicine, but have different concentrations.

Another problem associated with multi-dose vials is the transmission of infections. While many vials contain antibacterial preservatives, many do not contain antiviral agents. Adding to the problem can be faulty aseptic techniques adding to the contamination rate of the vials. Studies have revealed that the contamination rate may reach as high as 27%. The current storage devices used in the hospital and clinical setting are not addressing these concerns.

Traditional vial storage devices may attempt to save as much space as possible and store the vials in a manner that renders the vial packaging and label hidden. Obscuring portions of the vial label can possibly lead to an increased occurrence of medication error. Especially in an emergency room setting where timely treatment is so important, having vial labels or portions thereof hidden may lead to a health care provider administering the incorrect medication, possibly causing harm to the patient.

In addition, traditional vial storage devices position the vials where it is necessary to touch the top portion of the vial for removal from the storage device. The necessity to touch the area where the syringe interfaces with the vial could lead to the transmission of infections if aseptic techniques are not followed.

Another problem with traditional vial storage devices is the need for secondary labeling. The secondary labeling is typically needed as vial labels are hidden from view in the storage device. The use of secondary labeling results in health care providers using the secondary labels for identification instead of following the correct procedure of reading the label on the vial. This use of the secondary labeling for identification purposes results in an increase in medication errors.

In addition, as space is generally at a premium in a hospital or clinical setting, traditional vial storage can be rather large and bulky requiring additional space for storage. This is especially true in crash carts or other similar devices. Furthermore, although traditional vial storage provides actual storage of the vials or ampoules, there is little in the way of protection. In instances of use such as in connection with crash carts or processing trays, the vials or ampoules often undergo jostling. Many of these traditional storage devices thus may result in breakage of vials or ampoules.

Accordingly, being able to effectively store vials and other containers in a manner that can minimize medication errors and infection transmission is an ongoing challenge in the industry. Consequently, there is a need for a vial holder providing a storage system that can assist in the elimination of these medication errors and reduce the risk of infection transmission by properly positioning the vials as well as meet the space needs in today's hospital and clinical settings while protecting the vials and ampoules from breakage.

SUMMARY OF THE INVENTION

Accordingly, exemplary embodiments of the present invention have been made to remedy the previous mentioned problems. One objective of the exemplary embodiments is to provide storage for a variety of vial and ampoule sizes as well as test tubes, syringes and a variety of other containers (all which are referred to generally herein as "vials"). In the exemplary embodiments, the vials are stored so that a care provider or other user can make a clear visual inspection of the vial's labels and contents. This ability to clearly see the vial's labels eliminates the need for secondary labeling reducing the risk of medication errors. In addition, the positioning of the vials or other containers eliminates the need to touch or contact the top portions of the containers thus reducing the possibility of the transmission of infection. Furthermore, the configuration of the grippers allows for maximum protection of the vials container therein while also maximizing spacing.

Exemplary embodiments of the vial gripper are made from elastomeric materials and have a base that in some embodiments may be designed to lie flat in a storage medium such as a drawer of a crash cart other similar storage mediums typically found in a hospital or clinical setting, or in other embodiments may be designed for insertion into and retention by a guide on an elevated body having a top surface. The base of the gripper is sized in the former embodiments so as to be substantially coextensive with the vial or other container to be held therein. The elastic material guards against breakage while the sizing eliminates unnecessary material from the gripper thus allowing a greater number to be stored in a storage medium over traditional storage devices.

A clamp extends from the base and is also made from an elastomeric material. The clamp is configured to have a slotted aperture therein allowing a vial or other container to be passed through the slot to rest within the aperture. Since the clamp is made from an elastomeric material the clamp deforms while the vial or container is passed through the slot and conforms back to substantially its original shape once the vial or other container resides in the aperture. The elastomeric material applies a pressure on the vial or other container thus preventing the rotation in the aperture ensuring visibility of the label on the vial of other container. The vial or other container is simply removed by grasping the body of the vial or other container and pulling it back through the slot in the clamp.

Although discussed as residing flat in a drawer, it should also be noted that the base may be affixed to any surface using known adhesives or devices. This allows the gripper to be used vertically or horizontally, or any angle there between. Since the elastomeric material of the clamp is sufficient to hold the vial or other container within the clamp, vertical storage is possible.

The customization of the vial holder also allows for the addition of color coding further reducing the risk of medication error.

One objective of the exemplary embodiments is to provide storage for a variety of vial sizes as well as test tubes and a variety of other containers. In the exemplary embodiments, the vials are stored so that a care provider or other user can make a clear visual inspection of the vial's labels and contents. This ability to clearly see the vial's labels eliminates the need for secondary labeling reducing the risk of medication errors. In addition, the positioning of the vials or other containers eliminates the need to touch or contact the top portions of the containers thus reducing the possibility of the transmission of infection.

The vial holder may be used in a variety of ways including insertion into a tray unit, simply resting on a surface, or attached to a wall or other surface. The vial holder may also accommodate a variety of containers shapes and sizes allowing for customization based on the needs of the healthcare provider. The customization of the vial holder also allows for the addition of color coding further reducing the risk of medication error.

Exemplary embodiments provide for a vial holder. The vial holder includes a body and readily attachable clamps that are used to secure containers such as vials and test tubes. The body has an inclined surface against which the container may rest. A vertical piece is also provided and intersects with the inclined surface. The vertical piece may have tabs to allow the vial holder to be inserted into a tray unit or other similar slotted device.

A guide is present in the inclined surface near the intersection of the inclined surface and the vertical piece. The guide allows for the insertion of the clamps for holding the containers. A portion of the clamp is inserted into and through the guide and the remainder of the clamps protrudes from the inclined surface. The portion of the clamp extending from the inclined surface has a slot therein terminating in a circular aperture. The container to be held can then be inserted into the slot and come to rest in the circular aperture.

It is an object of this invention to provide a vial gripper and gripper assembly of the types generally described herein, being adapted for the purposes set forth herein, and overcoming disadvantages found in the prior art. These and other advantages are provided by the invention described and shown in more detail below.

BRIEF DESCRIPTION OF THE DRAWINGS

The advantages and other characteristics of the disclosed embodiments will be better understood when attention is directed to the accompanying drawings, wherein identical elements are indentified with identical reference numerals and wherein:

FIG. 12 is a perspective view of a second exemplary embodiment of a gripper assembly according to the inventive concept shown for retaining vials; and FIG. 13 is a front elevation view of the exemplary embodiment of FIG. 12; and FIG. 14 is a side elevation view of the exemplary embodiment of FIG. 12; and FIG. 15 is a perspective view of the two exemplary gripper assemblies of FIG. 9 installed in a tray unit.

DETAILED DESCRIPTION OF THE EXEMPLARY EMBODIMENTS

Exemplary embodiments of the present invention will now be described in greater detail. It should be recognized that the present invention can be practiced in a wide range of other embodiments besides those explicitly described, and the scope of the exemplary embodiments described are expressly not limited.

Figure 1:
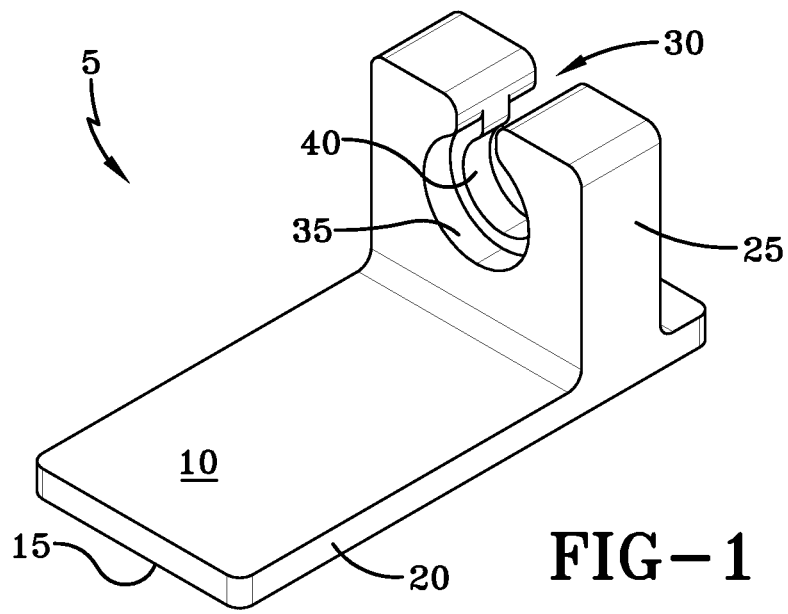
FIG. 1 is a perspective view of a first exemplary embodiment of a vial gripper according to the inventive concept shown for retaining vials.

Directing attention to the drawings and particularly to FIG. 1, a perspective view is provided for an embodiment of a vial gripper 5. As illustrated, the exemplary vial gripper 5 is primarily formed from a single piece of material. The material may be silicone, thermoplastic elastomer, hydrocarbon gel material or some other shock absorbing material that is capable of being formed or molded into the shape indicated in FIG. 1.

Figure 2:
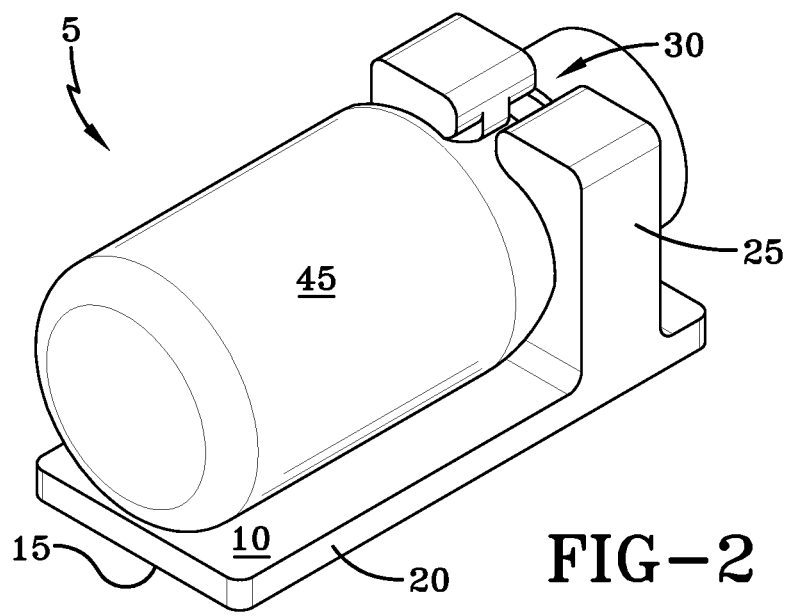
FIG. 2 is a perspective view of the exemplary embodiment of FIG. 1 shown retaining a vial therein.

As seen in FIG. 1, the gripper 5 has a base portion having a top surface 10 and a bottom surface 15 forming a base 20. A clamp 25 extends outward from the top surface 10 of the base 20. As illustrated, the clamp 25 has a substantially rectangular shape and a thickness sufficient to support a vial 45 (as shown in FIG. 2), ampoule, syringe or other such containers. A slot 30 is present on the side of the clamp 25 opposite the top surface 10 of the base 20 and extends toward the interior of the clamp 25 and terminates at an aperture 35 therein. The aperture 35 may be circular and has a diameter length larger than the dimensional width of the slot 30. The circular shape of the aperture 35 allows the clamp 25 to secure and hold a vial 45 and other containers. A ridge 40 is present in the aperture 35. The ridge 40 extends from the wall of the aperture 35 and is substantially circular having a smaller diameter than the aperture 35. The ridge 40 allows the clamp 25 to form a more complementary engagement with the vial 45, and other container to be held therein.

As shown in FIG. 2, a vial 45 is retained in the clamp 25 of the gripper 5. As illustrated, a portion of the vial 45, for example the neck, is passed through slot 30 and is retained in aperture 35 by ridges 40. The material used to construct the gripper is such that it may deform while the vial or other container is inserted into the slot 30, and once the vial or other container enters the aperture 35, the clamp 25 of the gripper 5 returns to its original configuration retaining the vial 45 or container therein. In addition, a pressure is applied to the vial 45 such that the vial is prevented from rotational motion relative to the gripper 5 under normal conditions in order to ensure visibility of the label on the vial 45.

In some embodiments, the base 20 of the gripper 5 is sized to be at least coextensive with the vial 45, ampoule, or other container held within the clamp 25. This ensures that the vial 45 or container is protected from damage. The gripper 5 is made from an elastic material that can protect the vial from breakage. Likewise, the base 20 of the gripper 5 should not be significantly bigger than the vial 45 or container held therein so that the gripper 5 will not be cumbersome while in storage. Although shown in a single size, it should be noted that the gripper 5 and the base 20 thereof, could be sized to accommodate standard sizes of vials 45 and other containers typically used in the hospital or clinical setting. This customization ensures that the base 20 of the gripper 5 does not have to substantially extend past the boundaries of the vial 45 or other container taking up valuable space within a storage unit, such a drawer. Alternative, the base 20 may include various notches, tabs, contoured surfaces, protrusions or the like for gripping, or in order to provide retention of the gripper in combination with a storage container, unit tray or the like. Additionally, the clamp 25 portion of the gripper 5 is also specifically sized to match the type and size of vial 45 or container held therein. This ensures a proper fit between the gripper 5 and the vial 45 or container held therein to maximize protection.

As noted in connection with FIGS. 1 and 2, the clamp 25 extends out from the top surface 10 of the base 20. The location along the base's 20 longitudinal axis from which the clamp 25 extends is dependent on the type of vial 45 or container to be held therein as will be apparent to those skilled in the art. The clamp 25 is positioned along the base 20 to align with features of the vial 45 or container that allows for easy retention of the vial 45 or container to be held therein. As illustrated in FIG. 2, the clamp 25 is positioned to align with the neck of the vial 45, while the base 20 is substantially coextensive with the vial 45 held therein. For example, for vials or other containers such as syringes or blood vials, some embodiments of the gripper optionally include multiple clamps.

Figure 3:
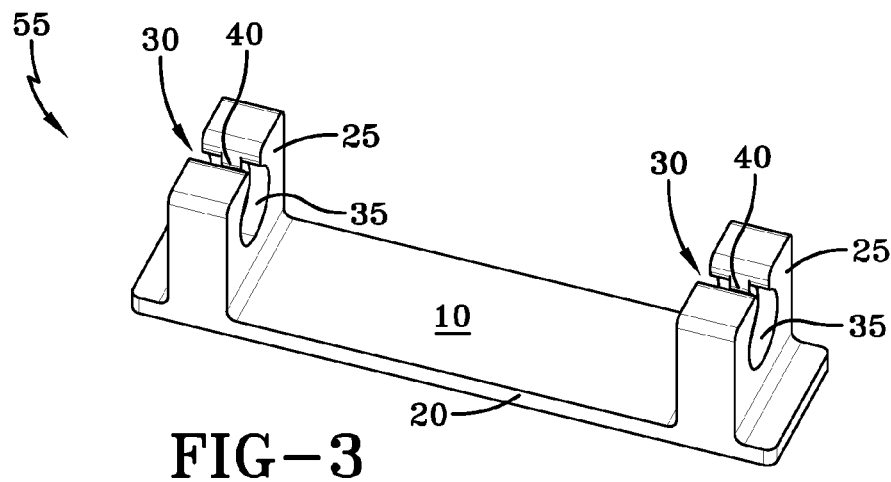
FIG. 3 is a perspective view of a second exemplary embodiment of a vial gripper according to the inventive concept shown for retaining vials.
Figure 4:
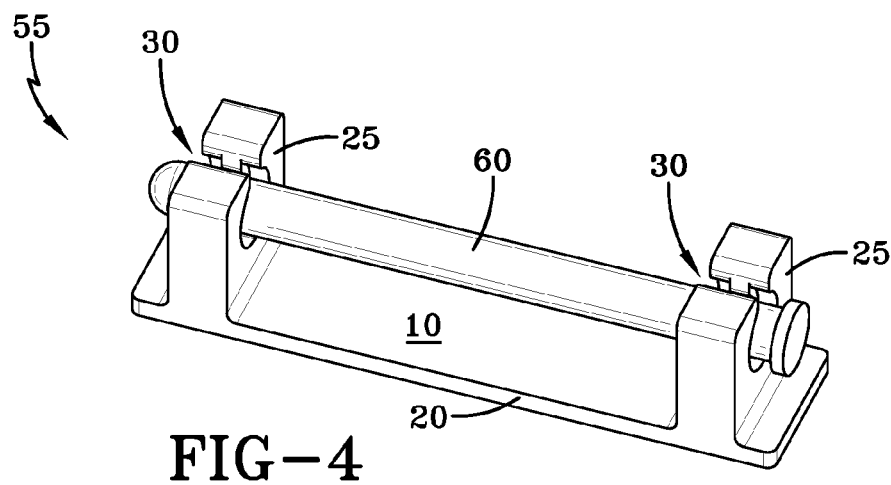
FIG. 4 is a perspective view of the exemplary embodiment of FIG. 3 shown retaining a syringe therein.
Figure 5:
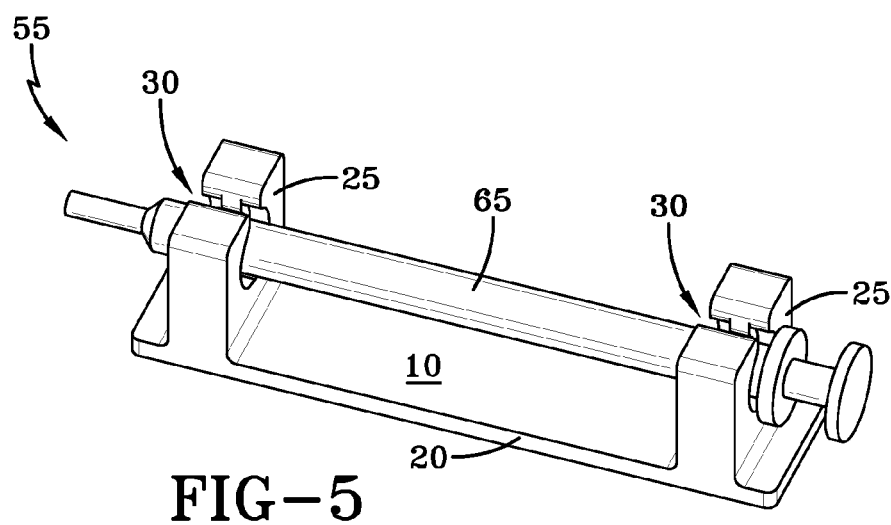
FIG. 5 is a perspective view of the exemplary embodiment of FIG. 3 shown retaining a vial therein.

The exemplary embodiment illustrated in FIGS. 3-5 depicts a gripper 55 for which two clamps 25 are positioned on and extend from the base 20. Such embodiments are useful for holding vials and other containers that are generally elongate in shape, such as the syringe 60 shown in FIG. 4 and the blood vial 65 shown in FIG. 5 engaged to and held by the gripper 55. The use of two clamps 25 in such a manner reduces the movement or shifting of the syringe 60, vial 65, etc. due to jostling, and increases the stability and thereby the protection from damage provided by the gripper 55 for those container types. As in previous embodiments, the clamps 25 each extend outwardly from the top surface 10 of the base 20, and receives a portion of the vial 65, syringe 60 or other such container by insertion into a slot 30 extending toward the interior of the clamp 25 and terminating at an aperture 35 therein. The aperture 35 may be circular and has a diameter length larger than the dimensional width of the slot 30. The circular shape of the aperture 35 allows the clamp 25 to secure and hold the vial 65, syringe 60 and other containers. A ridge 40 is present in the aperture 35. The ridge 40 extends from the wall of the aperture 35 and may be substantially circular having a smaller diameter than the aperture 35. The ridge 40 allows the clamp 25 to form a more complementary engagement with the vial 45, and other container to be held therein. It is also noted that, when two or more clamps 25 are utilized, that it is preferred for the clamps 25 to be aligned with respect to each aperture 35 and generally the shape of the vial.

Figure 6:
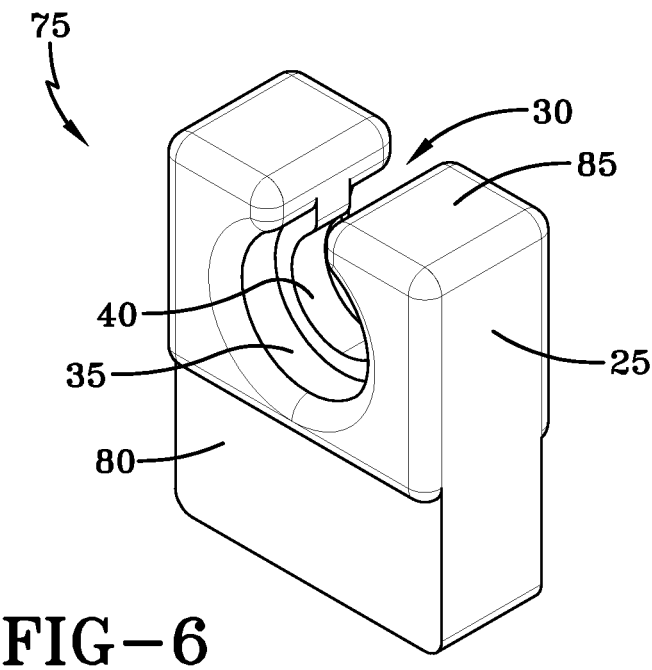
FIG. 6 is a is a perspective view of a third exemplary embodiment of a vial gripper according to the inventive concept shown for retaining vials.
Figure 7:
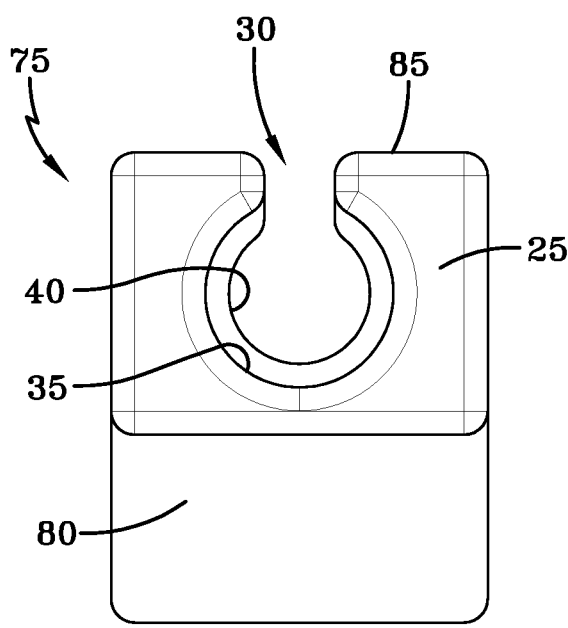
FIG. 7 is a front elevation view of the exemplary embodiment of FIG. 6.
Figure 8:
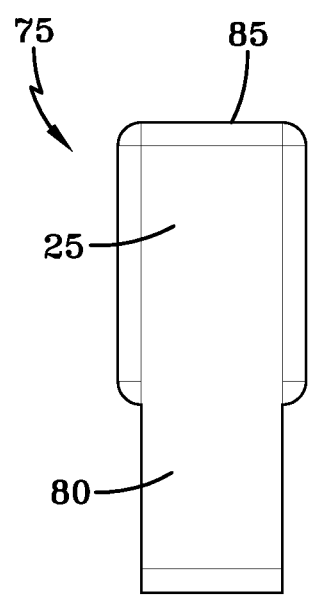
FIG. 8 is a side elevation view of the exemplary embodiment of FIG. 6.

Turning to FIGS. 6-8, a third exemplary embodiment of a generally rectangular gripper 75 is illustrated wherein the base 80 is not sized to be at least coextensive with a vial, ampoule, syringe, or other container held within the clamp 25. Rather, the gripper 75 is configured as an insertable gripper 75 for use as further described herein. The clamp 25 again includes a slot 30 extending into the interior of the clamp 25 from the top end 85 of the gripper 75 to terminate at an aperture 35 therein. The aperture 35 is preferably circular and is wider than the slot 30. It also preferably includes a ridge 40 extending from the wall of the aperture 35 having a smaller diameter than the aperture 35, thereby allowing the clamp 25 to form a more complementary engagement with the vial or other container to be held therein. The base 80 of the clamp 25 is preferably sized for insertion into a guide or other similar means for securing the gripper 75 to a surface, as will be explained if further detail below.

Figure 9:
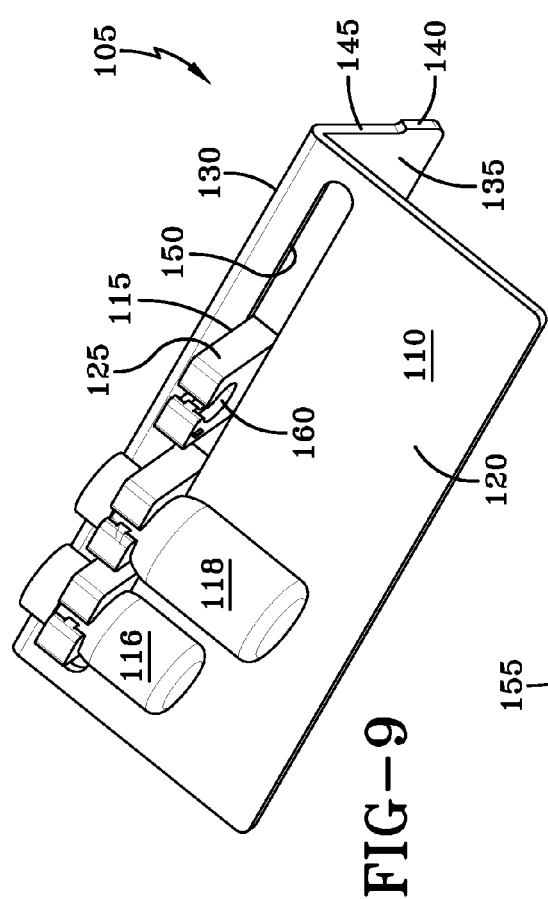
FIG. 9 is a perspective view of a first exemplary embodiment of a gripper assembly according to the inventive concept shown for retaining vials.
Figure 11:
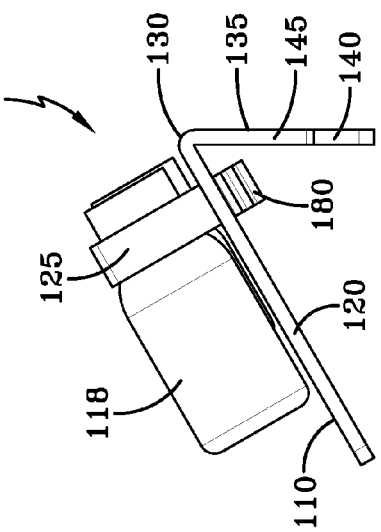
FIG. 11 is a side elevation view of the exemplary embodiment of FIG. 9.
Figure 10:
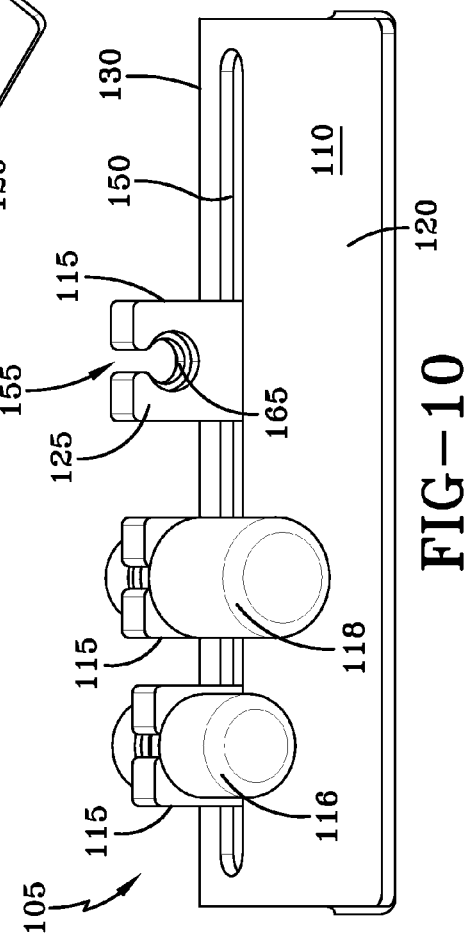
FIG. 10 is a is a front elevation view of the exemplary embodiment of FIG. 9.

Directing attention next to FIGS. 9-11, perspective, front and side views are provided, respectively, of an exemplary embodiment of a gripper assembly 105 including an insertable gripper 115 in use with a complementary elevated body 120. The gripper assembly 105 may be used independently or in conjunction with a tray unit (e.g., tray unit 190 in FIG. 15). As illustrated, the exemplary gripper assembly 105 is primarily constructed from two components, the first of which is a gripper 115 and the second of which is an elevated body 120. In the assembled configuration in FIG. 7, the exemplary gripper assembly 105 is capable of storing vials, test tubes, syringes, ampoules, and other similar containers (e.g., 116 and 118). It is understood that the elevated body 120 may be made from a variety of different materials that are capable of being disinfected or sterilized. One exemplary embodiment provides that the body 120 is made from polystyrene. The grippers 115 are made from an elastic material such as silicone or any suitable hydrocarbon gel material.

The body 120 has a top surface 110 having a generally rectangular perimeter and sized generally to be coextensive with a variety of vials and other containers stored thereon. The elevated body 120 includes a guide 150 or slot running a substantial portion of the entire longitudinal length of the elevated body 120. The guide 150 is defined by the body 120 and is preferably substantially parallel to a top edge 130 of the elevated body 120. Although shown with rounded ends it should be understood that the guide 150 may have a variety of dimensions and shapes.

The body 120 is elevated from a work surface (not shown) on which the gripper assembly rests 105 at a sufficient distance such that the base portion 180 of the insertable gripper 115 may be inserted into the guide 150 and retained therein without interference from the work surface. The work surface may be, for example, a counter top, hospital pharmacy work surfaces, processing trays, and the like. The gripper assembly 105 may be provided such that the elevated body 120 may rest horizontally, vertically, or at in inclined angle therebetween, and the resting position of the body 120 may be determined by the configuration of the work surface, tray unit, support body or combination thereof as further described herein.

As illustrated in FIG. 7, the elevated body 120 may be configured to rest at an inclined angle relative to horizontal. The elevated body 120 is elevated in this exemplary embodiment of a gripper assembly 105 by a support body 135 intersecting the top edge 130 of the elevated body 120. The support body 135 extends from the intersection with the top edge 130 of the elevated body 120 creating an acute angle between the elevated body 120 and the support body 135. As with the elevated body 120, the support body 135 may have a substantially rectangular perimeter. In order to secure some exemplary embodiments of the assembly 105 into a tray unit (e.g., 190 in FIG. 15) the support body 135 may have tabs 140 located on its side edges 145. The tabs 140 are inserted into channels 192 in the tray unit 190 to correctly position and stabilize the assembly 105.

The second component that makes up gripper assembly 105 is the insertable embodiment of the vial gripper 115 that includes a clamp 125 portion and an insertable base 180 portion as described in connection with FIGS. 6-8. As shown in FIGS. 9-11, the assembly 105 may have a plurality of grippers 115 inserted into the guide 150. The grippers 115 have a substantially rectangular shape and a thickness allowing for insertion into the guide 150. A slot 155 is present on a top side of the gripper 115 and extends towards the interior of the clamp 125 and terminates at an aperture 160 therein. The aperture 160 may be circular and have a diameter larger than the dimensional width of the slot 155. The circular shape of the aperture 160 allows the gripper 115 to secure and hold a vial, test tube, or other container (e.g., 116 and 118). In some embodiments, a ridge 165 may be present in both the aperture 160 and the slot 155. The ridge 165 extends from the walls of both the aperture 160 and the slot 155, and has a smaller diameter than the aperture 160 and a decreased width versus the slot 155. This ridge 165 allows the clamp 125 to form a more complementary engagement with the vials 116 and 118 to be held therein. The gripper 115 may be molded from an elastic material, such as silicone or hydrocarbons having the ability to form an elastic material suitable to support a vial or other such container.

Now directing attention to FIGS. 12-14, another exemplary embodiment of a gripper assembly 105 is shown. The assembly 105 is similar with the previous embodiment in many respects and includes an elevated body 120 and insertable grippers 115. As with the other exemplary embodiments, the elevated body 120 has a top surface 110 positioned at an incline by a support body 135. However, the support body 135 in this embodiment includes a bottom member 170 in addition to a side member 175. The bottom member 170 of the support body 135 extends from the side member 175 opposite the elevated body 120. The bottom member 170 may provide support as shown in FIG. 14, for instance.

The bottom member 170 may also be used to affix the assembly 105 to a wall or other surface. In this embodiment, adhesive may be placed on the bottom member 170 to adhere the assembly 105 to a wall or other support. In still other embodiments, mechanical fasteners may be used to attach the bottom member 170 to a wall to support the assembly 105. Such attachments may be made to the support body 135 generally in many such embodiments.

In either of the two previous embodiments, a user determines the arrangement of vials, or test tubes, etc. (e.g., 116 and 118) to be held in the gripper assembly 105. The insertable grippers 115 are then inserted into the guide 150. After the grippers 115 are secured within the guide 150, the vials are placed in the clamps 125. The elevated body 120 allows the vials to rest at an angle on the top surface 110 so that the labels are clearly visible whether the assembly 105 is used with a tray unit 190, attached to a wall or other surface, or simply resting on a surface. In addition, the inclined arrangement allows for the removal and insertion of the vials without the need to touch the area accessed by a syringe. By allowing a user to grasp the labeled portion of the container, the spread of infection may be reduced.

The customizable feature of the invention generally also allows for color coordination of all of the embodiments of the grippers. In some embodiments, the clamps, ridges, aperture walls or the like may have different colors signifying different types or classes of medication. This added level of visual notification may also help reduce the risk of medication error.

As shown in FIG. 15, the gripper assembly 105 may be inserted into a tray unit 190. To insert the assembly 105 into the tray unit 190 the tabs (e.g., 140 in FIG. 9) are aligned with the channels 192 in the tray unit 190. Once aligned the tabs are nested in the channels 192, and the entire assembly 105 is lowered until it rests against the bottom of the tray unit 190. As discussed herein, this type of organization may assist in the prevention of medication errors, but allowing customized medication trays.

Figure 16:
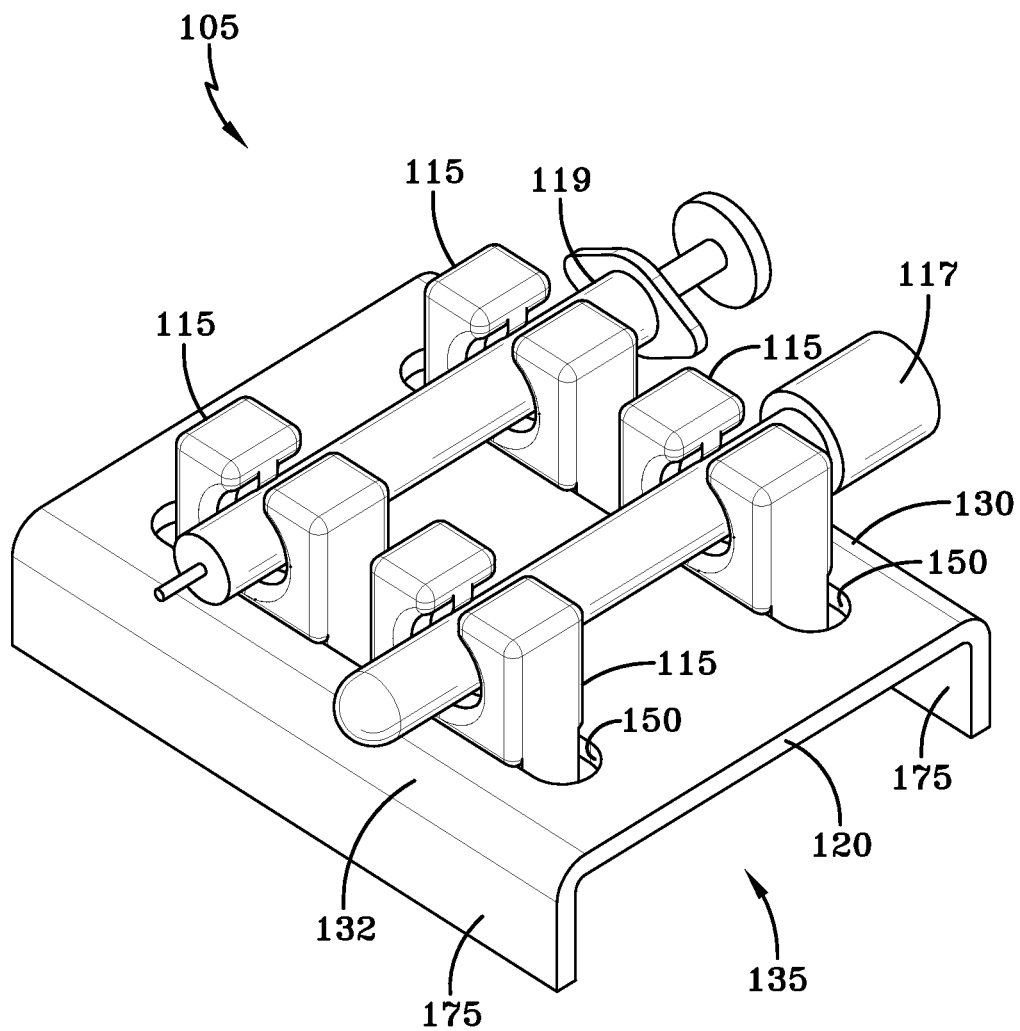
FIG. 16 is a perspective view of a third exemplary embodiment of a gripper assembly according to the inventive concept shown for retaining vials.

Another exemplary embodiment of a gripper assembly 105 is illustrated in perspective view in FIG. 16. As provided for in some embodiments, the elevated body 120 may be provided with two or more guides 150 in order to permit the use of two insertable grippers 115 and therefore two clamp 125 portions thereof to secure and hold the vial or other container (e.g., a blood vial 117 and syringe 119). This optional feature offers the benefits of increased stability and reduced vial movement, as described in connection with the embodiment of the gripper 55 depicted in connection with FIGS. 3-5. Furthermore, the assembly 105 embodiment shown in FIG. 16 is configured to position the elevated body 120 horizontally, wherein the support body 135 includes two parallel vertical side members 175, one each attached to a top edge 130 and a bottom edge 132 of the elevated body 120.

Figure 17:
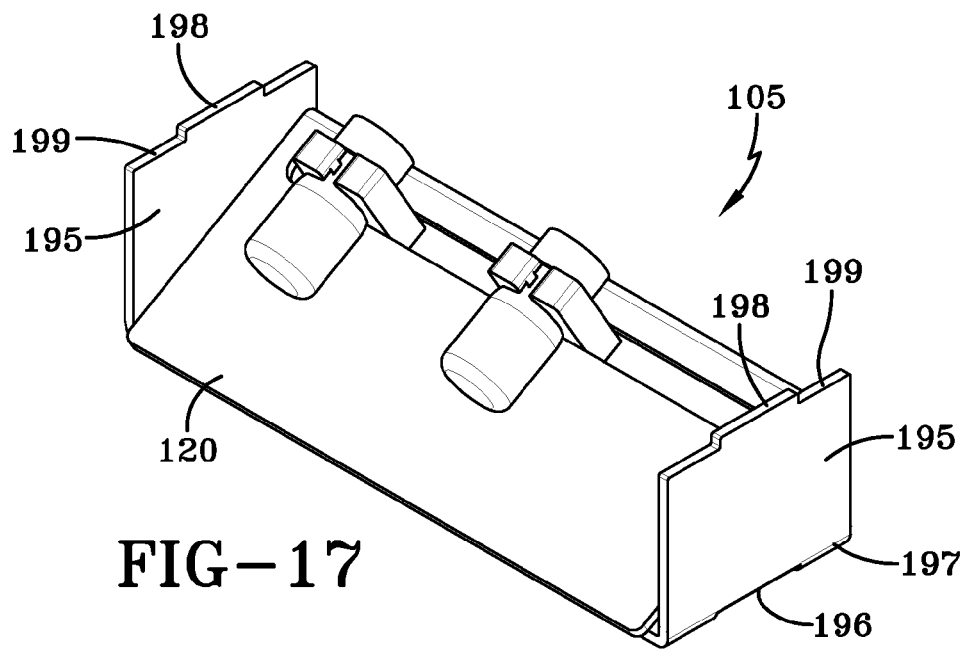
FIG. 17 is a perspective view of a fourth exemplary embodiment of a gripper assembly according to the inventive concept shown for retaining vials and including a stacking feature.
Figure 18:
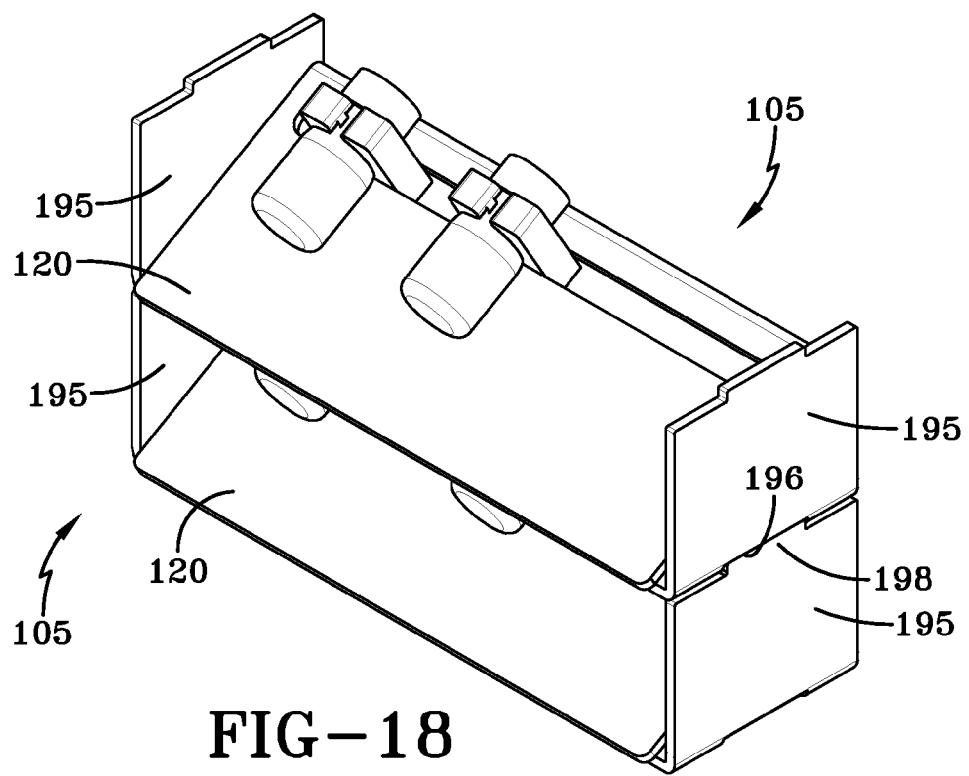
FIG. 18 is a perspective view of two of the exemplary gripper assemblies of FIG. 17 stacked in a vertical configuration.

The embodiment of the assembly 105 depicted in FIGS. 17 and 18 includes a pair of stacking members enabling multiple assemblies 105 be easily stacked vertically, thereby saving valuable storage space without losing any of the features offered by the present invention. The stackable embodiment of the assembly 105 includes a pair of opposing stacking side members 195 affixed to the elevated body 120 or the support body (not shown). The stacking side members 195 are of a generally rectangular shape and are positioned perpendicularly to the longitudinal axis of the elevated body 120. The stacking side members 195 each include a recess 196 formed in a bottom edge 197 and a protrusion 198 formed at a top edge 199, whereby the protrusion 198 of a first gripper assembly fits within the recess 196 of a second gripper assembly in registration when stacked vertically. A single assembly 105 is shown in FIG. 17, and two such assemblies 105 are shown in a stacked configuration in FIG. 18.

The customizable feature of the gripper 5 also allows for color coordination with color schemes already in place at the hospital or clinic. In some embodiments, the grippers 5 may have different colors signifying different types or classes of medication. This added level of visual notification may also help reduce the risk of medication error.

While the embodiments disclosed described the best modes known to the inventor at the time of filing, the scope of the invention is not to be limited to only the embodiments disclosed herein. Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A device for gripping and holding a vial comprising:
   a gripper molded from an elastic material comprising:
   a base shaped to be received into an elongated guide and having a bottom surface; and
   a clamp extending outwardly from the base and orthogonally with respect to the bottom surface of the base, comprising:
   an aperture; and
   a slot extending inward from an edge of the clamp and terminating at the aperture in the clamp;
   an elevated body having a longitudinal axis, a top surface and top and bottom edges;
   an elongated guide located in the elevated body and parallel to the longitudinal axis of the elevated body; and
   a support body intersecting the elevated body, the support body comprising a side member intersecting and elevating the top edge of the elevated body,
   wherein the base of the gripper is insertably retained within the guide.

2. The device of claim 1, wherein the support body further comprises a bottom member extending from the side member opposite the intersection with the elevated body.

3. The device of claim 1, further comprising a second guide located in the elevated body and parallel to the longitudinal axis of the elevated body.

4. The device of claim 3, wherein the support body comprises:
   a first side member intersecting the top edge of the elevated body; and
   a second side member intersecting the bottom edge of the elevated body,
   wherein the first and second side members are vertically positioned and elevate the elevated body in a horizontal position.

5. The device of claim 1, wherein the at least one side member further comprises two side edges and a tab located on each side edge.

6. The device of claim 5, further comprising a unit tray, said unit tray having a rectangular body and channels therein, said channels nesting said tabs therein when said elevated body is positioned within said unit tray.

7. The device of claim 1, further comprising a pair of stacking side members each intersecting a side edge of the elevated body perpendicular to the longitudinal axis, and each comprising:
   a protrusion formed within a top edge; and
   a recess formed within a bottom edge, wherein the protrusion is shaped to within the recess of a second device in registration when stacked vertically.

\* \* \* \* \*